UNITED STATES PATENT OFFICE 2,111,300

MONOAZO-DYESTUFFS AND THEIR MANUFACTURE

Emil Senn, Riehen, near Basel, Switzerland, assignor to firm J. R. Geigy S. A., Basel, Switzerland No Drawing. Application January 14, 1937, Serial No. 120,617. In Great Britain February 10, 1936

20 Claims. (Cl. 260—96)

According to this invention valuable new violet to green-blue monoazo-dyestuffs insoluble in water are made by combining a diazo-compound of a nitro-amino-sulphone of the general formula

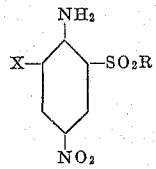

in which
X represents hydrogen, a nitro group or halogen, and
R represents an alkyl group such as methyl, ethyl, butyl and so on, with a mono-acyl-meta-phenylenediamine of the following general formula

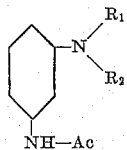

In the last named formula Ac represents a substituted or unsubstituted acyl radical such as HCO—, $CH_3CO$—, $C_2H_5CO$—, $C_3H_7CO$—, $C_{11}H_{23}CO$—, $C_2H_4$—OHCO—, $R_1$ represents a group such as methyl, ethyl, propyl, butyl, ω-hydroxyethyl, β,γ-dihydroxypropyl, β-hydroxy-γ-chloropropyl, β-hydroxy-γ-alkoxypropyl, epoxy-propyl, or a polyhydroxylalkyl radical of the sugar series, a phenyl group and so on, and $R_2$ represents hydrogen or one of the groups represented by $R_1$, $R_1$ and $R_2$ being the same or different in the case of tertiary substituted N-atoms.

The azo component may contain any other desired substituents subject, of course, to the condition that such substituents do not destroy the capacity for coupling and do not impart solubility in water to the dyestuffs.

The new dyestuffs have in general a very good solubility in alcohols, ketones, hydrocarbons such as petroleum, paraffin or benzine, oils, waxes and in the various modern solvents and their mixtures. It has been found that it is possible to adapt in large degree the solubility properties to the various purposes of application by suitable choice of the acid residue of the acylamino-group.

Some of the new dyestuffs are distinguished by a very good solubility in cellulose esters and cellulose ethers. They may either be dissolved in lacquers prepared with these substances or they may be used, after they have been brought into a fine state of subdivision by suitable additions, for dyeing textiles, films or shaped masses according to the suspension method.

By means of the new dyestuffs it is possible to produce violet to green-blue shades dischargeable to pure white, such as have hitherto been obtained only with coupling components of the aminonaphthalene and aminonaphthol series. However, the dyestuffs prepared with these components are practically without application especially for dyeing acetyl-cellulose owing to their exceedingly unsatisfactory fastness to light. The new coupling components used in the present invention thus fill an important gap especially in the construction of violet to blue acetyl cellulose dyestuffs which are fast to light.

Hitherto blue shades capable of being discharged and having good fastness properties could be produced on acetate artificial silk only with dyestuffs from 1-diazo-6-halogen-2,4-dinitrobenzenes and a few selected coupling components of the benzene series, such as alkyl-ω-hydroxyalkyl-cresidines. With these dyestuffs there were obtained at the best reddish-blue shades having the great disadvantage that they suffered considerable change towards red under artificial light. The production of blue dischargeable acetate artificial silk dyestuffs whose pure blue shades are not altered in artificial light but remain unchanged in tint and purity is therefore an object much to be desired. These requirements are fulfilled to a large extent, and in some cases practically completely, by the dyestuffs of the present invention. They include new dyestuffs which are distinguished by blue shades which are considerably displaced towards green and could not hitherto be obtained by means of hitherto known azo-components of the benzene series.

The use of mono-acyl-meta-phenylenediamines and their homologues and substitution products capable of being coupled as azo-components for making yellow to orange dyestuffs for dyeing cellulose esters and ethers has already been proposed in U. S. Patent No. 1,692,493. However, all the dyestuffs of this patent contain a free amino-group which can be diazotized and used for the production of developing dyestuffs on the fibre. From these dyestuffs the dyestuffs of the present invention differ in that they contain a secondary or tertiary amino-group in para-position to the azo-group. The acylamino group contained in the coupling components of the new dyestuffs proves to be the substituent which causes in most marked degree the hitherto known displacement of the shade towards blue or green. Consequently, the shades of all the new dyestuffs having the acylamino-group in ortho-position to the azo-group are displaced towards the blue end of the spectrum to a greater extent than those of the quite analogously constructed dyestuffs containing other substituents such as alkyl or alkoxy in said position. The constitution of the acid radical in the acylamino-group has itself practically no effect on the shade; this is of great importance in the production of the new dyestuffs which are to be adapted to various different solvents and emulsifying agents, since the solubility properties are dependent on the acyl group and can be varied by variation of this group without affecting the shade.

The following examples illustrate the invention, the parts being by weight.

*Example 1*

21.6 parts of 5-nitro-2-aminophenylmethylsulphone are diazotized in the usual manner with the required proportion of nitrosylsulphuric acid. When diazotization is finished the mixture is poured into a large quantity of ice-water and the diluted diazo solution is filtered if necessary. The clear solution is allowed to run into an aqueous solution of 28.2 parts of 4-ethoxy-3-di-ω-hydroxyethylamino-1-acetanilide. The formation of the dyestuff can be accelerated by neutralization of the strongly acid reaction towards Congo by addition of sodium acetate. After the formation of the dyestuff is finished the insoluble dyestuff which has precipitated is filtered and washed until neutral. When dry it is a dark powder which is soluble in organic solvents such as alcohol, acetone or ethyl-acetate to blue solutions. In the form of a suspension it dyes acetate artificial silk pure blue shades which can be discharged to white.

The azo-component used in this example can be made by heating 4-ethoxy-3-amino-1-acetanilide with a hydroxyethylating agent such as glycol-chlorhydrin with addition of an acid-binding agent such as calcium carbonate, magnesium carbonate or sodium carbonate. When recrystallized from water the new base forms small colourless needless of melting point 131° C.

*Example 2*

21.6 parts of 5-nitro-2-aminophenylmethylsulphone are diazotized in the usual manner with a nitrosylsulphuric acid corresponding with 6.9 parts of sodium nitrite, and the mixture is poured on to ice and then coupled with an aqueous solution of 28.2 parts of 4-methoxy-3-(ethyl-$\beta,\gamma$-dihydroxypropyl)-amino-1-acetanilide. The formation of the dyestuff is completed by the addition of sodium acetate and the dyestuff is isolated in the usual manner and dried. It is a dark powder which dissolves in acetone or ethyl-acetate to a blue solution, and in the form of a suspension yields blue shades on acetate artificial silk.

A similar dyestuff is obtained by using as diazo-component the corresponding ethylsulphone.

*Example 3*

A diazo-compound prepared in the usual manner from 21.6 parts of 5-nitro-2-aminophenylmethylsulphone is combined with an aqueous solution of 26.8 parts of 4-methoxy-3-di-ω-hydroxyethyl-amino-1-acetanilide. Coupling is completed by the addition of sodium acetate and the dyestuff which has precipitated is isolated in the usual manner and dried. It is a dark powder which is soluble in acetone or ethyl-acetate to a blue solution, and in the form of a suspension dyes acetate artificial silk blue shades.

A similar dyestuff is obtained if the corresponding ethylsulphone is used.

*Example 4*

A diazo-solution prepared in the usual manner from 21.6 parts of 5-nitro-2-aminophenylmethylsulphone is coupled with an aqueous solution of 23.8 parts of 3-di-ω-hydroxyethylamino-1-acetanilide. When coupling is finished the dyestuff is separated by filtering, washed until neutral and dried. It is a dark powder which is soluble in acetone or ethyl-acetate to a red-violet solution, and in the form of a suspension dyes acetate artificial silk violet shades which can be discharged to a pure white.

A similar dyestuff is obtained if the corresponding ethylsulphone is used.

3-di-ω-hydroxyethylamino-1-acetanilide can be made by the action of glycol-chlorhydrin on 3-amino-1-acetanilide in the presence of an acid-binding agent. The base is very easily soluble in water and in alcohol and crystallizes in the form of colourless prisms of melting point 119° C.

*Example 5*

26.1 parts of 2-amino-3,5-dinitro-1-phenylmethylsulphone are diazotized in concentrated sulphuric acid with a nitrosylsulphuric acid corresponding with 6.9 parts of sodium nitrite. When diazotization is finished the diazotization mixture is filtered and allowed to run in a thin stream into an ice-cold aqueous solution of 26.6 parts of 4-ethoxy-3-(ethyl-ω-hydroxyethyl)-amino-1-acetanilide while well stirring. When formation of the dyestuff is completeed the whole is filtered and the dyestuff washed until neutral and dried. The new dyestuff is a dark powder which is soluble in acetone or ethyl-acetate to a green-blue solution. In the form of a suspension it dyes acetate artificial silk fast green-blue shades which have a particularly beautiful colour by evening light and can be discharged to a pure white.

A similar dyestuff is obtained if the corresponding ethylsulphone is used.

4-ethoxy-3-(ethyl-ω-hydroxyethyl)-amino-1-acetanilide can be obtained by mono-hydroxyethylating 4-ethoxy-3-amino-1-acetanilide in known manner and ethylating directly by means of diethyl-sulphate the intermediate product without isolating it. The 4-ethoxy-3-(ethyl-ω-hydroxyethyl)-amino-1-acetanilide is thus obtained in an aqueous solution which can be further used directly.

*Example 6*

26.1 parts of 2-amino-3,5-dinitro-1-phenylmethylsulphone are diazotized in known manner and the diazo-compound is coupled in an ice-cold aqueous solution with 23.8 parts of 3-di-ω-hydroxyethylamino-1-acetanilide. The dyestuff formed is isolated in the usual manner. When dried it is a dark powder which is soluble in acetone or ethyl-acetate to a blue-violet solution, and in the form of a suspension dyes acetate artificial silk fast blue-violet shades which can be discharged to a pure white.

A dyestuff having similar properties is obtained if the corresponding ethylsulphone is used.

Example 7

26.1 parts of 2-amino-3,5-dinitro-1-phenyl-methylsulphone are diazotized with nitrosylsulphuric acid corresponding with 6.9 parts of sodium nitrite and the diazo-compound is coupled with an ice-cold aqueous alcoholic solution of 28.2 parts of 4-ethoxy-3-di-ω-hydroxyethylamino-1-acetanilide. By the addition of sodium acetate coupling is completed and the formed dyestuff precipitated. When dried it is a dark powder which is soluble in acetone or ethyl-acetate to a green-blue solution, and in the form of a suspension dyes acetate artificial silk green-blue shades having a particularly beautiful evening colour.

Dyestuffs of analogous properties are obtained if instead of the 2-amino-3,5-dinitro-1-phenyl-methyl- or -ethylsulphones or Examples 5–7 there are employed the 2-amino-3-halogen-5-nitro-1-phenylalkylsulphones such as 2-amino-3-chloro-5-nitro-1-phenylmethyl- or -ethylsulphone.

If instead of the methyl- or ethyl-sulphones used in the foregoing examples there are used sulphones having higher alkyl-groups such as butyl and so on, similar dyestuffs are obtained In the alkylated amino-group in the coupling components there may be present instead of a 3,ω-hydroxyethyl, ethyl-β,γ-dihydroxypropyl or ethyl-ω-hydroxyethyl-group, any of the groups indicated in the general description or, although only once, hydrogen; all possible combinations of these substituents may be used. In this manner the shade and also in some cases the solubility can be influenced. For making dyestuffs for acetate artificial silk it is to be recommended that at least one hydroxyalkyl-group should be present, for this group has a very favourable influence on the affinity for acetyl cellulose or the solubility in the cellulose ester derivative.

Instead of the acetyl-group in the acetyl-meta-phenylenediamine derivatives used in the above examples, there may, of course, be present other acyl-residues such as are indicated in the foregoing description. Formyl and lactyl derivatives are in general suitable in the case of dyestuffs for dyeing cellulose esters, whether in the form of textiles, films, masses or lacquers. Higher acyl-residues, such as lauryl and so on, are suitable in the case of dyestuffs for colouring fats, oils, waxes, turpentine, benzine and so on, whilst dyestuffs from urea or urethane derivatives are freely soluble in lower alcohols or similar organic solvents or mixtures thereof.

The azo component may contain other nuclear substituents in the free positions, provided that they do not inhibit the coupling and impart solubility to the dyestuffs; particularly the position 4 of the 1,3-acyldiamines is favourable and from the substituents the alkoxy groups like meth- and ethoxy are the best suitable.

What I claim is:—

1. A process for the manufacture of monoazo-dyestuffs comprising combining a diazo-compound of a nitro-amino-sulphone of the general formula

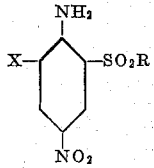

in which
X represents a radical selected from the group consisting of hydrogen, a nitro group and halogen, and
R represents a lower alkyl group, with a mono-acyl-meta-phenylenediamine of the following general formula

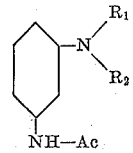

in which
Ac represents an acyl radical selected from the group consisting of HCO—, CH₃CO—, C₂H₅CO—, C₃H₇CO—, C₁₁H₂₃CO— and C₂H₄OHCO,
R₁ represents a monovalent organic radical and
R₂ represents a radical selected from the group consisting of hydrogen and monovalent organic radicals, the other free positions of the azo-component containing also nuclear substituents provided that they do not inhibit the coupling and impart solubility in water to the dyestuffs.

2. A process for the manufacture of monoazo-dyestuffs comprising combining a diazo-compound of a nitro-amino-sulphone of the general formula

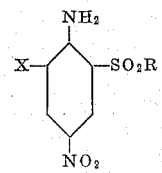

in which
X represents a radical selected from the group consisting of hydrogen, a nitro group and halogen, and
R represents a lower alkyl group,
with a mono-acyl-meta-phenylenediamine of the following general formula

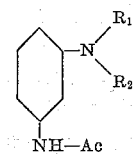

in which
Ac represents an acyl radical selected from the group consisting of HCO—,CH₃CO—, C₂H₅CO—, C₃H₇CO—, C₁₁H₂₃CO— and C₂H₄OHCO, and
R₁ and R₂ represent the same monovalent organic radicals, the other free positions of the azo-component containing also nuclear substituents provided that they do not inhibit the coupling and impart solubility in water to the dyestuffs.

3. A process for the manufacture of monoazo-dyestuffs comprising combining a diazo-compound of a nitro-amino-sulphone of the general formula

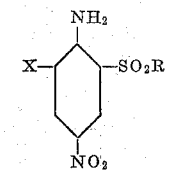

in which
X represents a radical selected from the group consisting of hydrogen, a nitro group and halogen, and
R represents a lower alkyl group, with a mono-acyl-meta-phenylenediamine of the following general formula

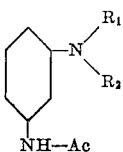

in which
Ac represents an acyl radical selected from the group consisting of HCO—, $CH_3CO$—, $C_2H_5CO$—, $C_3H_7CO$—, $C_{11}H_{23}CO$— and $C_2H_4OHCO$—, and $R_1$ and $R_2$ represent different monovalent organic radicals, the other free positions of the azo-component containing also nuclear substituents provided that they do not inhibit the coupling and impart solubility in water to the dyestuffs.

4. A process for the manufacture of monoazo-dyestuffs comprising combining a diazo-compound of a nitro-amino-sulphone of the general formula

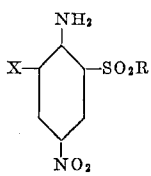

in which
X represents a radical selected from the group consisting of hydrogen, a nitro group and halogen, and
R represents a lower alkyl group,
with a monoacyl-meta-phenylenediamine of the following general formula

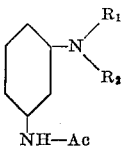

in which
Ac represents an acyl radical selected from the group consisting of HCO—, $CH_3CO$—, $C_2H_5CO$—, $C_3H_7CO$—, $C_{11}H_{23}CO$— and $C_2H_4OHCO$—
$R_1$ represents a radical selected from the group consisting of methyl, ethyl, propyl, butyl, ω-hydroxyethyl, β,γ-dihydroxypropyl, β-hydroxy-γ-chloropropyl, β-hydroxy-γ-alkoxypropyl, epoxypropyl, polyhydroxyalkyl radicals of the sugar series, a phenyl group,
$R_2$ represents a radical selected from the group consisting of hydrogen and the said group from which $R_1$ is selected, the other free positions of the azo-component containing also nuclear substituents provided that they do not inhibit the coupling and impart solubility in water to the dyestuffs.

5. A process for the manufacture of monoazo-dyestuffs comprising combining a diazo-compound of a nitro-amino-sulphone of the general formula

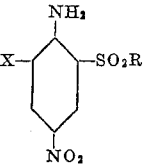

in which
X represents a radical selected from the group consisting of hydrogen, a nitro group and halogen, and
R represents a lower alkyl group,
with a mono-acyl-meta-phenylenediamine of the following general formula

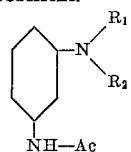

in which
Ac represents an acyl radical selected from the group consisting of HCO—, $CH_3CO$—, $C_2H_5CO$—, $C_3H_7CO$—, $C_{11}H_{23}CO$— and $C_2H_4OHCO$—
$R_1$ and $R_2$ represent different radicals selected from the group consisting of methyl, ethyl, propyl, butyl, ω-hydroxyethyl, β,γ-dihydroxypropyl, β-hydroxy-γ-chloropropyl, β-hydroxy-γ-alkoxypropyl, epoxypropyl, polyhydroxy alkyl radicals of the sugar series, a phenyl group, the other free positions of the azo-component containing also nuclear substituents provided that they do not inhibit the coupling and impart solubility in water to the dyestuffs.

6. A process for the manufacture of monoazo-dyestuffs comprising combining diazotized 5-nitro-2-aminophenylmethylsulphone with 4-methoxy-3-(ethyl-β,γ-dihydroxypropyl)-amino-1-acetanilide.

7. A process for the manufacture of monoazo-dyestuffs comprising combining diazotized 5-nitro-2-aminophenylmethylsulphone with 4-methoxy-3-di-ω-hydroxyethylamino-1-acetanilide.

8. A process for the manufacture of monoazo-dyestuffs comprising combining diazotized 2-amino-3,5-dinitro-1-phenylmethylsulphone with 3-di-ω-hydroxyethylamino-1-acetanilide.

9. As new products, the azo-dyestuffs of the general formula

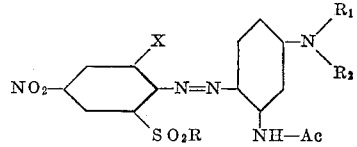

in which
X represents a radical selected from the group consisting of hydrogen, a nitro group and halogen,
R represents a lower alkyl group,
Ac represents an acyl radical selected from the group consisting of HCO—, $CH_3CO$—, $C_2H_5CO$—, $C_3H_7CO$—, $C_{11}H_{23}CO$— and $C_2H_4OHCO$—
$R_1$ represents a monovalent organic radical, and
$R_2$ represents a radical selected from the group consisting of hydrogen and monovalent organic radicals, the three free positions in the acyl-diamino-nucleus being occupied by any other substituent, said dyestuffs being insoluble in water and dyeing alcohols, ketones, hydrocarbons and cellulose derivatives violet to green-blue shades, the dyeings on fibres being dischargeable to white.

10. As new products, the azo-dyestuffs of the general formula

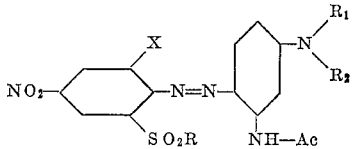

in which

X represents a radical selected from the group consisting of hydrogen, a nitro group and halogen, R represents a lower alkyl group, Ac represents an acyl radical selected from the group consisting of HCO—, CH₃CO—, C₂H₅CO—, C₃H₇CO—, C₁₁H₂₃CO— and C₂H₄OHCO—

R₁ and R₂ represent the same monovalent organic radicals, the three free positions in the acyl-diamino-nucleus being occupied by any other substituent, said dyestuffs being insoluble in water and dyeing alcohols, ketones, hydrocarbons and cellulose derivatives violet to green-blue shades, the dyeings on fibres being dischargeable to white.

11. As new products, the azo-dyestuffs of the general formula

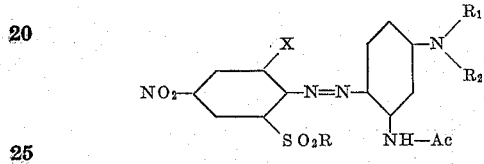

in which

X represents a radical selected from the group consisting of hydrogen, a nitro group and halogen, R represents a lower alkyl group, Ac represents an acyl radical selected from the group consisting of HCO—, CH₃CO—, C₂H₅CO—, C₃H₇CO—, C₁₁H₂₃CO— and C₂H₄OHCO—

R₁ and R₂ represent different monovalent organic radicals, the three free positions in the acyl-diamino-nucleus being occupied by any other substituent, said dyestuffs being insoluble in water and dyeing alcohols, ketones, hydrocarbons and celulose derivatives violet to green-blue shades, the dyeings on fibres being dischargeable to white.

12. As new products, the azo-dyestuffs of the general formula

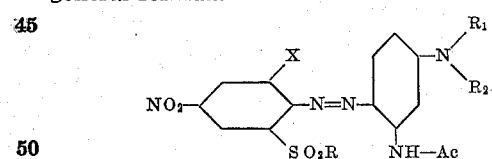

in which

X represents a radical selected from the group consisting of hydrogen, a nitro group and halogen, R represents a lower alkyl group, Ac represents an acyl radical selected from the group consisting of HCO—, CH₃CO—, C₂H₅CO—, C₃H₇CO—, C₁₁H₂₃CO— and C₂H₄OHCO—

R₁ represents a radical selected from the group consisting of methyl, ethyl, propyl, butyl, ω-hydroxyethyl, β,γ-dihydroxypropyl, β-hydroxy-γ-chloropropyl, β-hydroxy-γ-alkoxypropyl, epoxypropyl, polyhydroxyalkyl radicals of the sugar series, a phenyl group, R₂ represents a radical selected from the group consisting of hydrogen and the said group from which R₁ is selected, the three free positions in the acyl-diamino-nucleus being occupied by any other substituent, said dyestuffs being insoluble in water and dyeing alcohols, ketones, hydrocarbons and cellulose derivatives violet to green-blue shades, the dyeings on fibres being dischargeable to white.

13. As new products, the azo-dyestuffs of the general formula

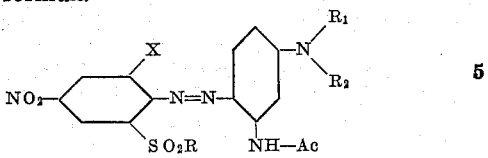

in which

X represents a radical selected from the group consisting of hydrogen, a nitro group and halogen, R represents a lower alkyl group, Ac represents an acyl radical selected from the group consisting of HCO—, CH₃CO—, C₂H₅CO—, C₃H₇CO—, C₁₁H₂₃CO— and C₂H₄OHCO—

R₁ and R₂ each represent the same radicals selected from the group consisting of methyl, ethyl, propyl, butyl, ω-hydroxyethyl, β,γ-dihydroxypropyl, β-hydroxy-γ-chloropropyl, β-hydroxy-γ-alkoxypropyl, epoxypropyl, polyhydroxyalkyl radicals of the sugar series, a phenyl group, the three free positions in the acyl-diamino-nucleus being occupied by any other substituent, said dyestuffs being insoluble in water and dyeing alcohols, ketones, hydrocarbons and cellulose derivatives violet to green-blue shades, the dyeings on fibres being dischargeable to white.

14. As new products, the azo-dyestuffs of the general formula

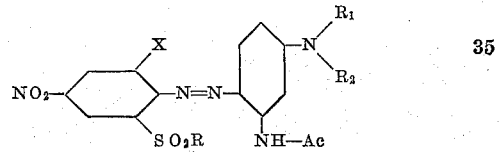

in which

X represents a radical selected from the group consisting of hydrogen, a nitro group and halogen, R represents a lower alkyl group, Ac represents an acyl radical selected from the group consisting of HCO—, CH₃CO—, C₂H₅CO—, C₃H₇CO—, C₁₁H₂₃CO— and C₂H₄OHCO—

R₁ and R₂ represent different radicals selected from the group consisting of methyl, ethyl, propyl, butyl, ω-hydroxyethyl, β,γ-dihydroxypropyl, β-hydroxy-γ-chloropropyl, β-hydroxy-γ-alkoxypropyl, epoxypropyl, polyhydroxyalkyl radicals of the sugar series, a phenyl group, the three free positions in the acyl-diamino-nucleus being occupied by any other substituent, said dyestuffs being insoluble in water and dyeing alcohols, ketones, hydrocarbons and cellulose derivatives violet to green-blue shades, the dyeings on fibres being dischargeable to white.

15. As new products, the azo-dyestuffs of the formula

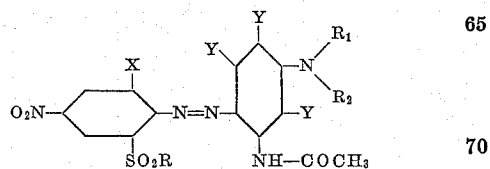

in which

X represents a radical selected from the group consisting of hydrogen and a nitro group, R represents a lower alkyl group, R₁ and R₂ represent radicals selected from the group of lower alkyl and hydroxyalkyl radicals, Y represents any substituent not imparting solubility in water, said dyestuffs being insoluble in water and dyeing alcohols, ketones, hydrocarbons and cellulose derivatives violet to green-blue shades, the dyeings on fibres being dischargeable to white.

16. As new products, the azodyestuffs of the formula

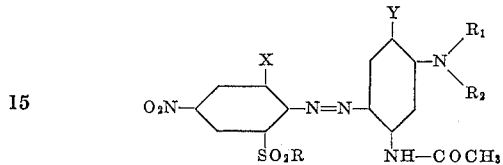

in which
X represents a radical selected from the group consisting of hydrogen and a nitro group,
R represents a lower alkyl group,
R₁ and R₂ represent radicals selected from the group of lower alkyl and hydroxyalkyl radicals,
Y represents a member of the group consisting of hydrogen and —O—(lower alkyl), said dyestuffs being insoluble in water and dyeing alcohols, ketones, hydrocarbons and cellulose derivatives violet to green-blue shades, the dyeings on fibres being dischargeable to white.

17. As new products, the azo-dyestuffs of the formula

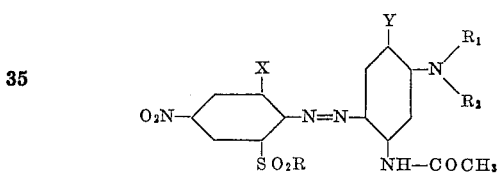

in which
X represents a radical selected from the group consisting of hydrogen and a nitro group,
R represents a lower alkyl radical selected from the group of methyl and ethyl,
R₁ and R₂ represent same or different radicals selected from the group of methyl, ethyl, ω-hydroxyethyl, β,γ-dihydroxypropyl,
Y represents a member of the group consisting of H, methoxy and ethoxy.

18. As new products, the azo-dyestuffs of the formula

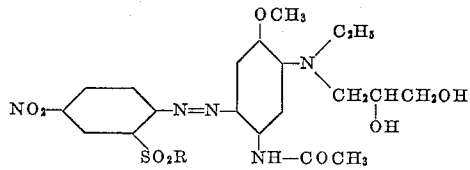

in which R is selected from the group consisting of methyl and ethyl, being dark powders insoluble in water, soluble in acetone and in ethyl-acetate to blue solutions and dyeing acetate silk blue shades, the dyeings being dischargeable to white.

19. As new products the azo-dyestuffs of the formula

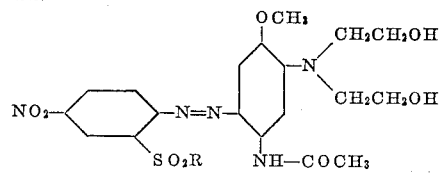

in which R is selected from the group consisting of methyl and ethyl, being dark powders insoluble in water and soluble in acetone and in ethyl-acetate to blue solutions and dyeing acetate silk blue shades, the dyeings being dischargeable to white.

20. As new products the azo-dyestuffs of the formula

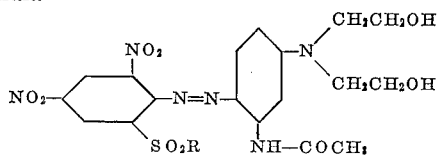

in which R is selected from the group consisting of methyl and ethyl, being dark powders insoluble in water and soluble in acetone and in ethyl-acetate to blue-violet solutions and dyeing acetate silk blue-violet shades, the dyeings being dischargeable to white.

EMIL SENN.